(12) United States Patent
Guzelgunler

(10) Patent No.: US 11,948,444 B2
(45) Date of Patent: Apr. 2, 2024

(54) METHODS AND SYSTEMS OPTIMIZING SWIMMING POOL AND RESTAURANT SERVICE OPERATIONS BY UTILIZING OCCUPANCY DETECTION DEVICE

(71) Applicant: Yilcan Guzelgunler, Troy, OH (US)

(72) Inventor: Yilcan Guzelgunler, Troy, OH (US)

( * ) Notice: Subject to any disclaimer, the term of this patent is extended or adjusted under 35 U.S.C. 154(b) by 0 days.

(21) Appl. No.: 18/216,480

(22) Filed: Jun. 29, 2023

(65) Prior Publication Data

US 2024/0005769 A1 Jan. 4, 2024

Related U.S. Application Data

(62) Division of application No. 17/324,840, filed on May 19, 2021, now Pat. No. 11,741,814.

(51) Int. Cl.
| | | |
|---|---|---|
| G08B 21/08 | (2006.01) | |
| G08B 7/06 | (2006.01) | |
| H04W 4/021 | (2018.01) | |

(52) U.S. Cl.
CPC .......... *G08B 21/086* (2013.01); *G08B 7/068* (2013.01); *H04W 4/021* (2013.01)

(58) Field of Classification Search
CPC ...... G08B 21/086; G08B 7/068; H04W 4/021

USPC ..................................... 340/539.12
See application file for complete search history.

(56) References Cited

U.S. PATENT DOCUMENTS

| | | | |
|---|---|---|---|
| 2002/0115435 A1* | 8/2002 | Soh ................... | G08B 7/068 455/500 |
| 2005/0030162 A1* | 2/2005 | Stambaugh .......... | G06Q 50/12 340/4.6 |
| 2018/0082525 A1* | 3/2018 | Rajaraman .......... | G07F 17/3223 |
| 2019/0279475 A1* | 9/2019 | Watt .................... | G08B 5/36 |
| 2020/0356910 A1* | 11/2020 | Nguyen ............... | G06K 19/0716 |
| 2021/0080262 A1* | 3/2021 | O'Shea ................ | G06F 3/0488 |

\* cited by examiner

*Primary Examiner* — Kerri L McNally

(57) ABSTRACT

The present invention disclose an occupancy detection device and related system and method for detecting presence of at least one person at or near a table or in a swimming pool with at least one sensor indicating an occupancy status locally with at least one light source and communicating it to at least one mobile device by means of at least one wireless communication method. The occupancy detection device, with the use of at least one sensor, at least one additional status is communicated to at least one mobile device. A plurality of occupancy detectors can be connected in a mesh or a star network and communicate to at least one mobile device by a wireless communication method or combinations of a wired and a wireless communication methods.

17 Claims, 4 Drawing Sheets

METHODS AND SYSTEMS OPTIMIZING SWIMMING POOL AND RESTAURANT SERVICE OPERATIONS BY UTILIZING OCCUPANCY DETECTION DEVICE

FIELD OF THE INVENTION

The present invention relates to an occupancy detection, and more particularly it relates to an occupancy detection device, and related system and method, that detect occupancy at and near a table or in a swimming pool or in some type of a platform by using at least one of the numerous sensor options, detects presence of at least one person and a moving object and an operating object, and indicates the status of the table or the swimming pool with at least one light source and on at least one mobile device via a wireless and/or wired combinations of communication means.

BACKGROUND OF THE INVENTION

In a restaurant, a meeting hall or a dinning setting there are multiple tables and some of them are occupied by people and some of them are not. There is a need for people attending to a gathering to know, which tables are occupied, which tables are not occupied, and the busyness of the gathering in a convenient way. For instance, if a restaurant is a buffet style, one could leave the table and when he/she return to the table and realize it has been cleaned up or taken over by a new occupant. Similarly, in a swimming pool, it is desirable to monitor the activity in the pool in case of intrusion, when the homeowner is away. In other case such as children's safety in the swimming pool, it is desirable to monitor children's activity when adults are not nearby the pool. Likewise, it is beneficial in a commercial swimming pool to monitor the presence of hotel customers in the pool.

The conventional occupancy detectors do not apparently describe about nor are they specifically tailored toward detecting occupancy at and near the table of at least one person. The conventional occupancy detectors also do not disclose about indication of the status of the table and user inputs in variety of ways. Further, the conventional occupancy detectors do not teach anything about monitoring the activities in the private or commercial swimming pool or monitoring the presence of at least one person in and near the swimming pool. They are clearly differentiable from the present invention both in utility and design. The unique characteristics and features of the device of the present invention are therefore, unrepresented within the prior arts. Further, the conventional occupancy detectors encounter various problems along with functional limitations. Hence, there is a significant need and void in the market for inventing an occupancy detection device which detect occupancy at and near a table of at least one person. Further, there is a need for inventing an occupancy detection device which monitor the activities in the private or commercial swimming pool and/or monitor the presence of at least one person in and near the swimming pool.

SUMMARY OF THE INVENTION

The present invention relates to an occupancy detection device, and related system and method, which address the needs which were not fulfilled by the conventional arts. According to an embodiment of the present invention, a system and a method is provided to detect occupancy at and near a table of at least one person. The present invention is able to use a light source to indicate the status of the table and accept user inputs in variety of ways, wherein the status are in form of, but not limited to messages such as "occupied", "unoccupied", "reserved", "out of service", "happy birthday". The status also include measurements, calculations, estimations and any inputs and compilations of inputs from its components of the device. The occupancy detection device is able to stand by itself and it is able stand with a connection to at least one mobile device by means of wireless and/or wired means of communication. The occupancy detection device is also configured to be a member of a network, wherein a plurality of occupancy detection devices are on other tables connected in a wireless network. Each occupancy detection device is able to communicate its status to and receive commands from a remote device wirelessly. The remote device can be a central device or a mobile device.

According to an embodiment of the present invention, a system and a method is provided to detect swimming pool occupancy of at least one person in the pool and the occupancy of at least one running object, and communicate this status to a remote device wirelessly and/or wired means of communication. The present invention is able to detect, measure, calculate and estimate various aspects of the pool status and pool system, but not limited to, the status as "rainy weather", "windy weather", "pump is running", "pump is stopped", "water depth" and "water amount in the pool".

According to an embodiment of the present invention, the occupancy detection device detects the presence of an occupant, comprising at least one accelerometer, a microphone, a vibration sensor, a laser, a liDAR, a motion detector, an ultrasound sensor, a time of flight sensor and with a sensor similar in nature of detection. The occupancy detection device then indicates through a light source on the table for people to see the status of the table. A built-in time delay handles the situations when the occupants leave the table temporarily for instance to get more food or any other reason, the light source indicator stays on indicating occupied table status.

Furthermore, the occupancy detection device of the present invention comprises a wireless communication capability to inform the staff about the status of the tables and track the turn-over of the occupants. Furthermore, for example, in a resort hotel setting, the status of tables is communicated to a mobile app on a mobile device for hotel guests to adjust their time of arrival to the restaurant depending on the busyness.

Furthermore, the occupancy detection device of the present invention comprises a service button for the restaurant workers to clean the dirty dishes off the table without changing the occupied status or to take care of any other need the guests might have. The occupancy detection device comprises a second user input button that bypasses the sensor detecting the occupancy and eliminating the sensor needed for detection to change the status of the table to occupied status. With the press of the second user input button, the occupancy status of the device is initiated with a timeout timer, which can be adjustable. The occupancy detection device comprises a third button that is used to clear the occupancy indication of the table manually. In this embodiment, button concept is used for a purpose to achieve simplicity to explain the user input capabilities of the present invention. However, the buttons mentioned here are not limited to physical buttons. It is a collection of the user inputs to activate certain functionality. Therefore, the user inputs can be implemented in variety of ways and combinations such as a dial and buttons with a display, or a display with just buttons or a display with capacitive touch buttons or a gesture detection sensor or a Near Field Communication (NFC) or a Bluetooth connection.

According to another embodiment of the present invention, the occupancy detection device can be used in a swimming pool as a pool occupancy detector. Detecting presence of at least one person in a swimming pool has various benefits. One of them is monitoring the activity in the pool in case of intrusion, when the homeowner is away. Another one is monitoring children's activity when adults are not nearby the pool. Similarly, it is beneficial in a commercial pool application to monitor the presence of hotel customers in the pool.

Some swimming pool pumping systems has an SVRS (safety vacuum release system) feature. SVRS in the swimming pool when implemented as part of a pump motor control system is used to detect the presence of an entrapment of a person and to shut off the pump to save the life of that person. According to another embodiment, the present invention can be used in a swimming pool application to transmit the occupancy status to a pool pump controller or a pool automation system and not allow the pumping system to get into a non-safe SVRS (safety vacuum release system) operation while a swimmer is present in the pool. According to another embodiment, the pool pump control system can transmit to the pool occupancy detector the state of the SVRS operation, wherein the pool occupancy detector can warn the people not to enter the pool for certain amount of time. This warning can be in the way of flashing light or warning sound or signal transmitted to a mobile device. The pool occupancy detector can also embody rain and wind detection, sunlight load detection. This information can be transmitted to the user via wireless communication means.

The occupancy status of the swimming pool can be utilized by the automation system to keep the pool cleaner. When a person or persons are detected in the pool, the automation system or the pool pump controller uses this information to increase the pump speed to increase the water circulation and filtering water more often. Aforesaid feature will change the regular run schedule of the pool pump until the swimmers are clear from the pool for a certain amount of time, wherein the automation system or the pool pump controller will allow the speed of the pump to return to normal schedule. According to another embodiment, the status information can be used along with a chemical treatment device information to decide when to modify the pump running speed depending on the chemical composition. The same status information can be used by the chemical treatment device to change the treatment schedule and adjust the amount of chemicals used. In addition, the pool occupancy detector device can detect moving and operating objects such as pool cleaners in the pool. Similarly, a special pool pump speed is run to fit the need of the cleaner by making the pump run schedule adaptive based on the need of swimmers and the pool.

The present invention can be arranged in multiple power supply options such as solar cell charged battery, solar cell charged battery with super capacitor, solar charged super capacitor, rechargeable battery from an outlet source or just with a non-rechargeable battery power source.

Other aspects of the present invention will be clearer after reading the following detailed description of the preferred embodiment with reference to the accompanying and drawings and viewed in accordance with the appended claims.

BRIEF DESCRIPTION OF THE DRAWINGS

Other objects, advantages and novel features of the invention will become apparent from the following detailed description of the present embodiment when taken in conjunction with the accompanying drawings. These figures are not intended to limit the scope of the present invention but rather illustrate certain attributes thereof.

Figure 1:
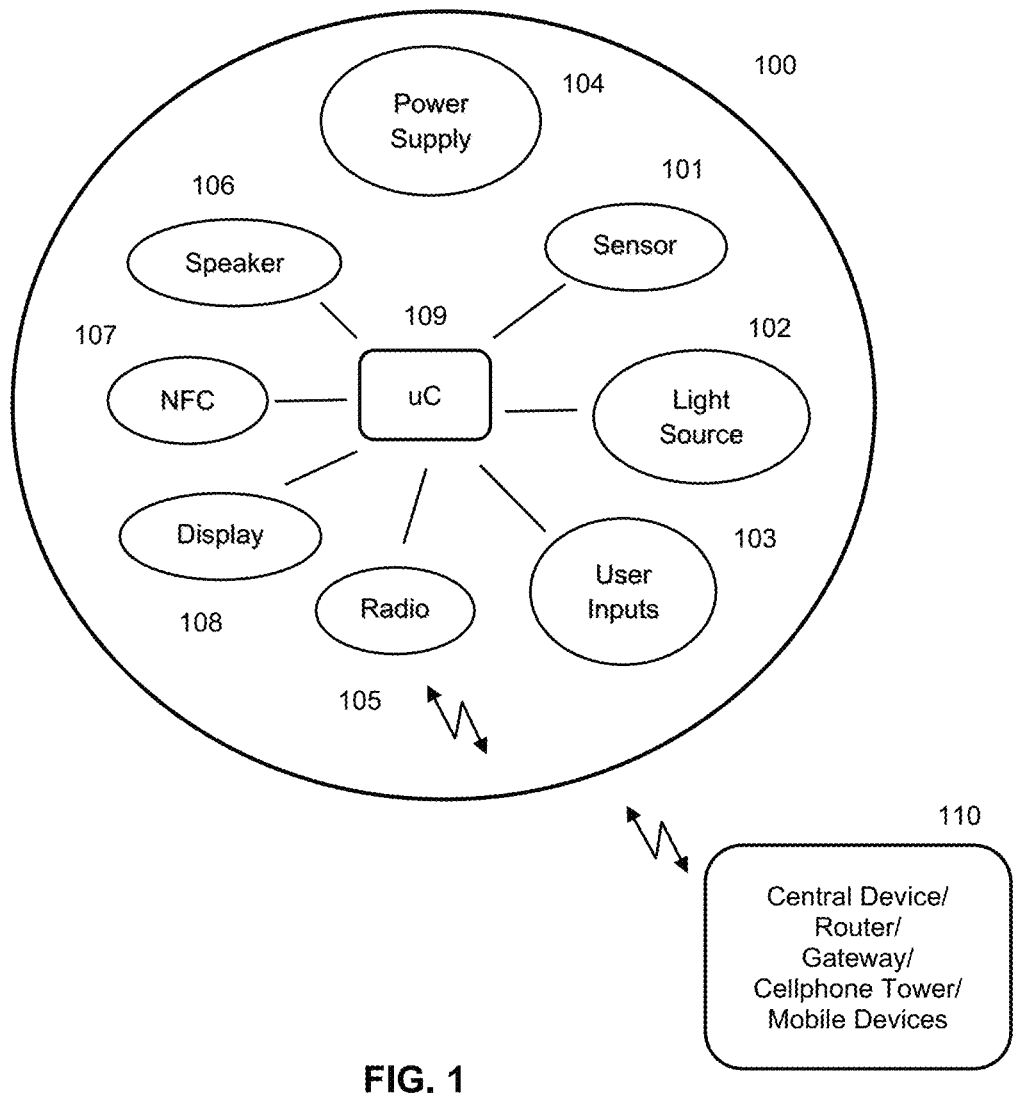
FIG. 1 is a block diagram of an occupancy detection device in its generic form, and its communication capability, according to an embodiment of the present invention.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAIL DESCRIPTION OF THE INVENTION

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

Before any embodiments of invention are explained in detail, it is to be understood that the invention is not limited in its applications to the details of construction and arrangement of components set forth in the following description or illustrated in the following drawings. The invention is capable of other embodiments and being practiced or of being carried out in various ways.

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

It is to be understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Reference will now be made in detail to a presently preferred embodiment of the invention, an example of which is illustrated in the accompanying drawings.

Referring to FIG. 1, an occupancy detection device 100 and its components are shown. The present invention as every pieces explained below can be used in a variety of combinations. For instance, a color light source 102 can be used along with a display 108 or the present invention can have only the display 108 or only the color light source 102. Another example can be given for a user input. Some of the variations of the user input may not be present in some configurations of the present invention such as the option of reserved user input and displaying the status of reserved or adjustable timeout user input and displaying the timeout time.

According to an embodiment of the present invention, the occupancy detection device 100 is controlled by a microprocessor 109, which is configured to collect data from a plurality of sensors 101, a plurality of user inputs 103, a radio 105, a NFC (Near Field Communication) 107, and then configured to control the light source 102 and the radio 105. In an alternative embodiment, the microprocessor 109 is replaceable with a customized logic circuit for this purpose in variety of ways of hardware and programmable structure.

A power supply 104 provides power to the occupancy detection device 100. The power supply 104 can be, but not limited to a solar powered rechargeable battery, a rechargeable battery from an outlet, a non-rechargeable battery, a solar cell powered super capacitor, a solar cell charged battery with a super capacitor.

The sensors 101 connected to the microcontroller 109, to detect the presence of at least one occupant and the status of a platform. The platform includes but not limited to a table, a swimming pool, a standing area where people are present. The occupancy detection can be accomplished in a variety of sensor and sensor combinations such as an accelerometer and a plurality of vibration sensors by detecting any displacement of a surface or a body of water. It can be accomplished with a microphone by detecting sound levels in air or under water. Furthermore, these types of sensors are used to detect rainy and windy weather conditions. They are also used for detecting the pool pump operating state such as running, stopped and pumping motor speed levels. Alternatively, the occupancy detection is accomplished with a plurality of distance measurement sensors such as ultrasound, sonic, light, laser or liDAR sensors.

According to an embodiment of the present invention, in the swimming pool, further status of the pool and the pool area such as air and water temperatures, water pH level, water chemical composition are detected by a plurality of additional sensors. There are various other sensors and sensor combinations that can be used for this purpose and other ancillary data collection and monitoring. For instance, time of flight, pressure, ultrasound and sonic sensors can be used directly or indirectly for water depth measurement status and water volume calculation status. Furthermore, a conductivity sensor for detecting presence of water or no water can be another status the swimming pool embodiment can have. The variety of sensors can be used is not limited to the ones listed here. Any sensors that is in its nature that can measure and detect mentioned statuses can be used for this purpose. The swimming pool embodiment can communicate with a swimming pool automation system and collect a SVRS status of the swimming pool and indicate this information to at least to the occupants of the pool, people around the pool, and on mobile devices.

According to an embodiment of the present invention, in the table occupancy detection, the light source 102 indicates visually the "occupancy", "vacancy", "not-in-service", "reserved" status and some other message to the table and people around such as "happy birthday". The light source 102 can be any number and types of light sources such as LED, neon, incandescent light sources. The status of the table or the platform can be indicated in variety of ways such as color of light or lighting pattern of the light source 102 with single or multiple colors of light source. The display 108 can be used as a primary or as a secondary status indicator alone side the light source 102.

The display 108 can also be used to display the user inputs 103 and messages sent to the table or to the platform. The user inputs 103 can be implemented in a variety of ways such as buttons, dials, a capacitive touch sensor, a gesture detecting sensor, an NFC (near field communication) input and a Bluetooth connection. The user inputs 103 are used as manually setting an occupancy status, which in turn starts a fix or variable timer. One of the user inputs 103 is used manually clearing the occupancy status. One of the user inputs 103 is used to take the table out-of-service. One of the user inputs 103 is used for a service request. One of the user inputs 103 is used to set the occupancy time out. One of the user inputs 103 puts the occupancy detection device 100 into reserved table status and its associated light source 102 and the display 108. The NFC 107 can be another way a user inputs his/her presence with a mobile device or an NFC key. Once user checks in, a timer can be started to indicate the status of the table. In the case of the NFC key, which can be a dedicated key or the mobile device, user information can be transferred to a central device 110 for hotel management tracking the user check-in to meals and other activities such as paying for an extra drink in a restaurant. The user check-in can also be via a wireless connection such as Bluetooth, where the user selects the table for the table status indication and securing his/her place at the table. Similarly, table vacancy can be detected when the user leaves by the Bluetooth wireless disconnection.

The radio 105 enables the wireless communication with the central device 110, a gateway, a router, a cell phone network and a direct communication with the user mobile device. Radio electronics and protocol part of the wireless communication can be various technologies such as Bluetooth, Wi-Fi, ZigBee, Z-Wave, and Thread. The central device or the central unit 110 is a dedicated full function device that allows full access to control and monitoring of a plurality of occupancy detectors for the administrating staff. The central device 110 can collect data, do various calculations and estimations and display them on a screen.

Figures 2A, 2B:
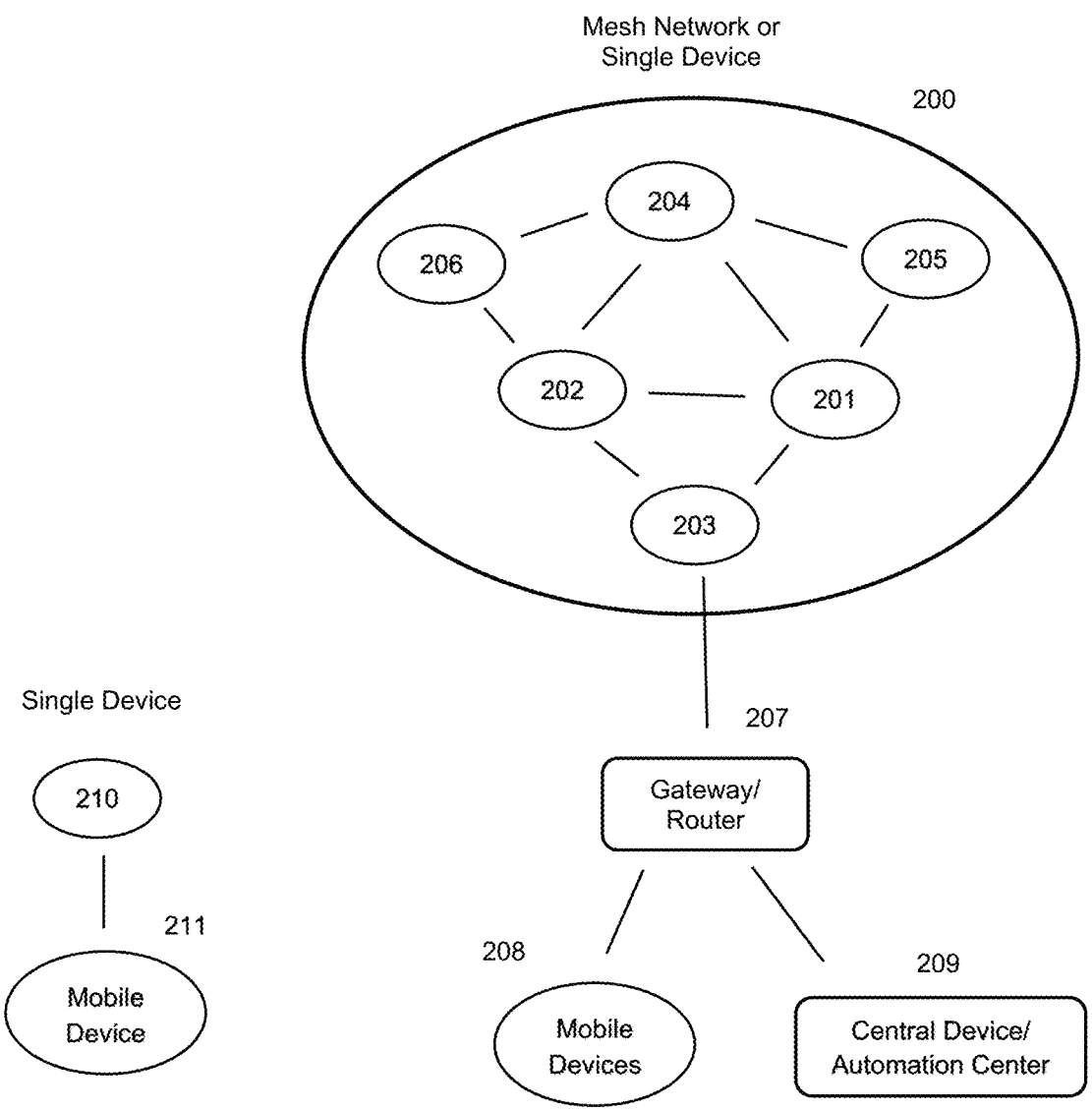
FIG. 2A shows a single unit direct communication arrangement.
FIG. 2B is a mesh wireless network connected units communicating to a central unit, an automation center, and a plurality of mobile devices, according to an embodiment of the present invention.
Figure 3:
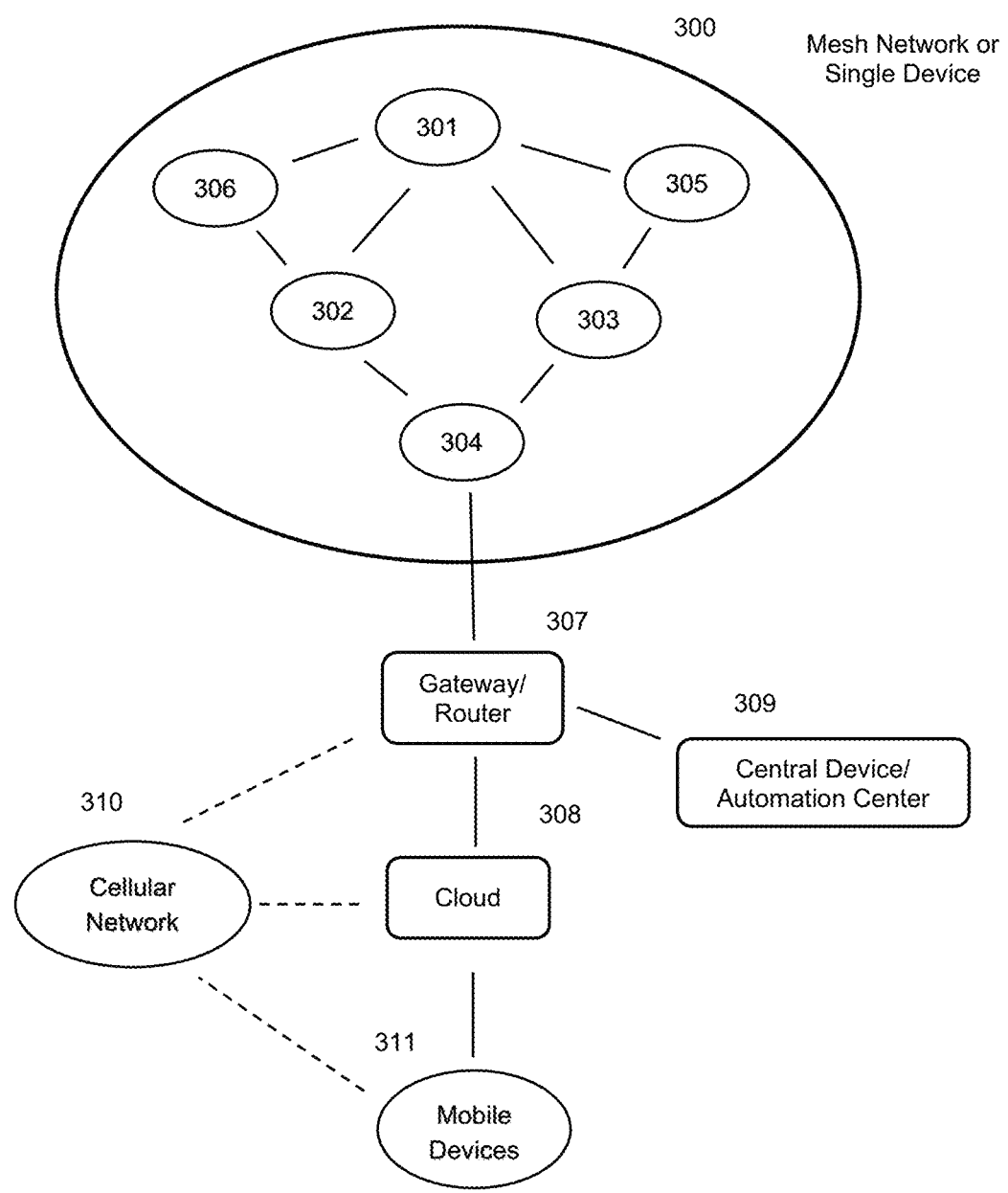
FIG. 3 is a mesh wireless network connected units communicating to a plurality of mobile devices via a cloud and/or a cellular network connection, according to an embodiment of the present invention.

Referring to FIG. 2 and FIG. 3, a plurality of network topologies for the occupancy detectors for both the table and the swimming pool applications are shown according to an embodiment of the present invention. In FIG. 2, the occupancy detectors are 201 to 206, and 210. In FIG. 3, the occupancy detectors are 301 to 306. It shall be noted that the depicted mesh networks in FIG. 2 and FIG. 3 can be replaced with a single device instead of multiple devices in the mesh network. This arrangement will be more applicable to the swimming pool application as shown in FIG. 2A. FIG. 2 is a demonstration of a local network and direct communication. FIG. 2B shows a local network such a home, a water park, a hotel or a restaurant. The occupancy detectors 201, 202, 203, 204, 205, 206 form a mesh network topology 200. It is assumed in the drawings, each occupancy detector is acting as a repeater in the mesh network 200. All communicate with a central device 209, where the hotel, resort or restaurant staff has access for all the features. The mesh network topology 200 also is connected to a gateway and/or a router 207 which can communicate with a plurality of individual mobile devices 208 over a wireless network such as a Wi-Fi. Hotel, resort or restaurant staff can have a dedicated mobile device app or special mode of the guest mobile app, which will give them access to all features as an administrator just like on the central device 209. Further, FIG. 2A shows a single device direct connection between the single occupancy detector 210 and a mobile device 211, which will be more applicable to the swimming pool application.

In FIG. 3, according to an embodiment of the present invention, the occupancy detectors 301, 302, 303, 304, 305, 306 form a mesh network topology 300 and they communicate to a gateway/router 307. The gateway 307 communicates to a cloud 308 and a plurality of mobile devices 311 have access to the occupancy status via the cloud connection. In this embodiment, one option is a central device or an automation center 309 to be connected to the mesh network topology 300 through the cloud connection. The second option is the central device or the automation center 309 communicates with the mesh network topology 300 locally via the gateway 307. The gateway 307 have a wired or wireless connection to the cloud 308. The alternative wireless option is via a cellular network 310, which is shown with dashed lines. It shall be noted that the mesh network topologies 200, 300 depicted in the embodiments in FIG. 2B and FIG. 3 can be implemented as a star network topology.

Figure 4:
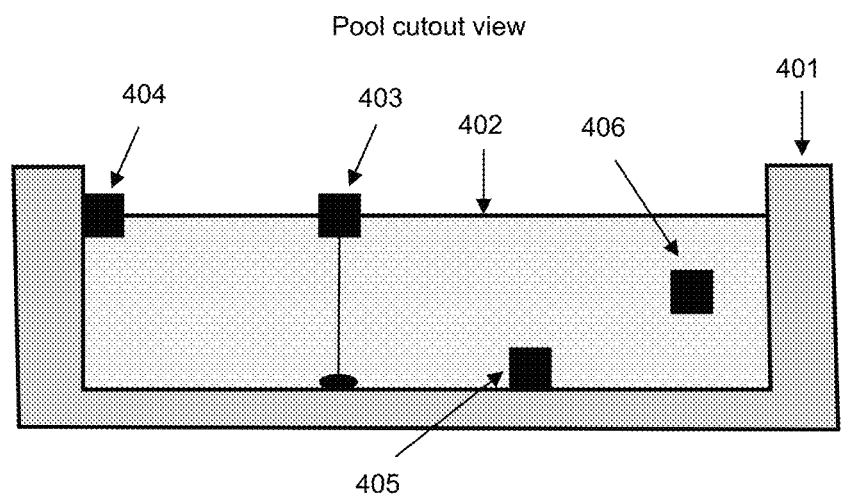
FIG. 4 shows a plurality of placement arrangements of a swimming pool occupancy detector in the swimming pool, according to an embodiment of the present invention.

FIG. 4 depicts the swimming pool occupancy application in form of a plurality of pool occupancy detectors, according to various embodiments of the present invention. In one embodiment, a pool occupancy detector 403 is floating on and in the water. In another embodiment, a pool occupancy detector 404 is attached to the side wall of the pool. Further in another embodiment, a pool occupancy detector 405 is on the floor of the pool. Still, further in another embodiment, a pool occupancy detector 406 is floating in the water. In all the embodiments, the pool occupancy detectors 403, 404, 405, 406 will have at least one sensor such as the accelerometer to detect the presence of at least one person in the pool and at least one object moving or running in the pool such as a pool cleaner. In addition to the pool occupancy detection, the pool occupancy detectors 403, 404, 405, 406 are able to detect pump status "running" or "stopped", "rainy weather", "windy weather" with the same sensor or different sensor options and combinations. The present invention with the addition of at least one time of flight sensor, sonar sensor, ultrasound sensor, pressure sensor and some other depth measurement means that can measure the depth of the water and estimate the water lacking and the required amount of water to be added to the pool. This information can be transmitted to the user alone with the occupancy information. In all embodiments, the pool occupancy detectors 403, 404, 405, 406 will be contacting with water. With more sensors such as chemical sensor, temperature sensor, the present invention can provide a variety of information about the pool and the pool system. All of these detections and measurements in and around the pool can be achieved with one or multiple sensors and sensor types and combinations. Furthermore, these information not only can be transmitted to the pool user or to a pool management body such as a contractor and a pool maintenance staff, but also to a pool or a building automation system where the automation system can arrange and use the information to take certain actions and at the same time notify the user.

When at least one pool occupancy detector is floating, one arrangement is free floating, where the pool occupancy detector can travel in the pool. The other arrangement is that at least one pool occupancy detector is fixed or has a limited area to move in the pool with some kind of an anchoring means such as one end of a string attached to the pool occupancy detector and the second end of it is tied to a weight where the weight is dropped to the bottom of the pool or the second end is attached to the wall of the pool. Any arrangements of the pool occupancy detectors can be powered by a solar cell and a battery power sources.

The pool occupancy detection can also exists as the single device or as the mesh network topologies 200, 300. The occupancy detection device 100 has the wireless communication capability to the mobile device 110 such as a smart phone with an App as shown in FIG. 1. FIG. 2 depicts the local network communication as well as local and direct communication with the mobile device 211 or the mobile devices 208. FIG. 3 depicts the use of the non-local network to communicate to the mobile devices 311. In one embodiment, the mesh network of the occupancy detectors or the single occupancy detector communicates to the mobile devices and the automation center via the cloud computer. In another embodiment, the mesh network of the occupancy detectors or the single occupancy detector communicates to the mobile devices via first communicating to the automation center and then the automation center communicates back to the mobile devices about the statuses of the occupancy detectors. In another embodiment, the mesh network of the occupancy detectors or the single occupancy detector communicates to the mobile devices via a cellular network or a cellular network and the cloud computer combinations. In the case of the single detector communication to the mobile device, the cloud computer can be bypassed leaving only the cellular network communication. The alternative paths of the communications are depicted in FIG. 3 with the dash lines. The wireless connectivity most commonly achieved by Bluetooth or Wi-Fi, since these are the most convenient communication means to mobile devices. However, it is not limited to these two methods of wireless communication, which can include other wireless network methods such as Thread, ZigBee, ZWave, and Wirepas.

In one embodiment, due to the size of the pool, the plurality of pool occupancy detectors can be deployed in one pool or in a water park type of an environment where there could be multiple pools, which may require the plurality of pool occupancy detectors to be deployed. In both embodiments, the occupancy detectors will be in the star or the mesh network configuration, which will be connected in the network topologies as described in FIG. 2 and FIG. 3.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives. It is inferred that the foregoing description is only illustrative of the present invention and it is not intended that the invention be limited or restrictive thereto. Many other specific embodiments of the present invention will be apparent to one skilled in the art from the foregoing disclosure. All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

What is claimed is:

1. An occupancy detection device comprising: a microprocessor unit, at least one sensor, at least one light source, at least one user input, at least one power source and at least one radio,
wherein the at least one sensor is selected from an accelerometer sensor, a spring loaded vibration (mechanical vibration) sensor, a piezoelectric vibration sensor, a mechanical tilt sensor, an infrared light sensor, an ultrasound sensor, a sonar sensor, a microphone sensor, a loadcell, a gesture sensor, a time of flight (time-of-flight) sensor, a liDar sensor and a laser sensor;
wherein said occupancy detection device is attached to a platform, wherein the platform is a table and/or a post and/or a stand and/or a wall and/or a furniture and/or a floor in a designated area in a venue, wherein the venue is a dining room or a restaurant or a meeting venue or an entertainment venue or a sporting venue, wherein the platform accommodates at least one person seating or standing, wherein the platform is indoors and/or outdoors;
wherein said occupancy detection device is configured to detect a status of the platform or a plurality of status of the platform via the at least one sensor and/or indicate the status of the platform or the plurality of status of the platform, wherein the status of the platform or the plurality of statuses of the platform includes a presence of the at least one person at the platform, a non-presence of a person at the platform, a no person at the platform, an availability for use of the platform, a non-availability for use of the platform, an ongoing use description of the platform, a planned use description of the platform and a service description of the platform, wherein said occupancy detection device indicates the status of the platform or the plurality of statuses of the platform via the at least one light source;
wherein the at least one user input is selected from a button, a capacitive touch sensor, a dial, a switch, a gesture sensor, a barcode scanner, a quick response (QR) code scanner, a wireless communication via Bluetooth and a wireless communication via near field communication (NFC), wherein the at least one user input is used to detect the status of the platform or the plurality of statuses of the platform;
wherein said occupancy detection device is used as a single detector device or as an occupancy detector network, wherein the occupancy detector network is configured as a mesh network or a star network, wherein the mesh network and the star network are comprised by network and protocol structure of at least one of Bluetooth, ZigBee, ZWave, Wi-Fi, Wirepas, Thread, 6LoWPAN, and any other wireless networks and protocols that allow wireless mesh network structure and/or wireless star network structure; and
wherein the single detector device or the occupancy detector network configured to communicate (transmit and/or receive) wirelessly via the at least one radio, the status of the platform or the plurality of statuses of the platform to at least one mobile device and/or a central device, wherein the central device allows full access for controlling and monitoring of the single detector device or the occupancy detector network for an administrating staff of the venue.

2. The occupancy detection device of claim 1, further configured with at least one display, wherein the status of the platform or the plurality of statuses of the platform is indicated on the at least one display, wherein the status of the table platform or the plurality of statuses of the platform includes at least one message, wherein the at least one user input is used to detect the status of the platform or the plurality of statuses of the platform.

3. The occupancy detection device of claim 1, further configured to detect the status of the platform or the plurality of statuses of the platform via a wireless input method of the wireless communication via Bluetooth and/or the wireless communication via near field communication (NFC), wherein the occupancy detection device is in communication with the at least one mobile device and/or at least one near field communication (NFC) key via the wireless input method, wherein the status of the platform or the plurality of statuses of the platform includes at least one message.

4. The occupancy detection device of claim 1, further configured to change the status of the platform or the plurality of statuses of the platform after a certain amount of time the platform is occupied and/or the platform is unoccupied, wherein the certain amount of time is configurable to be fixed or adjustable.

5. The occupancy detection device of claim 1, further configured to operate with the at least one power source selected from a solar power, a rechargeable battery, a non-rechargeable battery, a super capacitor, an ultra-capacitor and an outlet power.

6. The occupancy detection device of claim 1, wherein the occupancy detector network or the single detector device communicates to at least one of the central device and the at least one mobile device through a cloud computer and/or a cellular network the status of the platform or the plurality of statuses of the platform,
wherein the occupancy detector network or the single detector device is connected to at least one of a gateway, a router, a plurality of gateways and a plurality of routers to form a local network that communicates to the cloud computer and/or the cellular network,
wherein the cloud computer and/or the cellular network communicates to the at least one mobile device,
wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure.

7. The occupancy detection device of claim 1, wherein the occupancy detector network or the single detector device communicates to at least one of the central device and the at least one mobile device through a local network the status of the platform or the plurality of statuses of the platform,
wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure.

8. The occupancy detection device of claim 1, wherein the occupancy detector network or the single detector device communicates to the at least one mobile device through the central device the status of the platform or the plurality of statuses of the platform,
  wherein the occupancy detector network or the single detector device and the central device are connected to a local network,
  wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure,
  wherein the occupancy detector network or the single detector device communicates to the central device through the local network, wherein the central device communicates to a cloud computer and/or the cellular network, wherein the cloud computer and/or the cellular network communicates to the at least one mobile device.

9. The occupancy detection device of claim 1, wherein the at least one mobile device comprises one or more of at least one user mobile device, at least one checked-in mobile device and at least one staff mobile device, wherein the at least one user mobile device is used by possible guests of the venue who monitor the status of the platform or the plurality of statuses of the platform and not checked in to the platform, wherein the at least one user mobile device becomes the at least one checked-in mobile device when the at least one user mobile device checks in to the platform using the wireless communication via Bluetooth or the wireless communication via near field communication (NFC), wherein the at least one staff mobile device is used by the administrating staff of the venue, wherein the status of the platform or the plurality of statuses of the platform includes at least one message, wherein the at least one staff mobile device and/or the central device communicates (transmit and/or receive) the at least one message to the at least one checked-in mobile device.

10. A venue service optimization system comprising: an occupancy detection device, at least one mobile device and/or a central device,
  wherein said occupancy detection device is attached to a platform, wherein the platform is a table and/or a post and/or a stand and/or a wall and/or a furniture and/or a floor in a designated area in the venue, wherein the venue is a dining room or a restaurant or a meeting venue or an entertainment venue or a sporting venue, wherein the platform accommodates at least one person seating or standing, wherein the platform is indoors and/or outdoors;
  wherein said occupancy detection device is configured to detect a status of the platform or a plurality of status of the platform and/or indicate the status of the platform or the plurality of status of the platform, wherein the status of the platform or the plurality of statuses of the platform includes a presence of the at least one person at the platform, a non-presence of a person at the platform, a no person at the platform, an availability for use of the platform, a non-availability for use of the platform, an ongoing use description of the platform, a planned use description of the platform and a service description of the platform, wherein said occupancy detection device indicates the status of the platform or the plurality of statuses of the platform via the at least one light source;
  wherein the occupancy detector device configured with at least one user input, wherein the at least one user input is selected from a button, a capacitive touch sensor, a dial, a switch, a gesture sensor, a barcode scanner, a quick response (QR) code scanner, a wireless communication via Bluetooth and a wireless communication via near field communication (NFC), wherein the at least one user input is used to detect the status of the platform or the plurality of statuses of the platform;
  wherein said occupancy detection device is used as a single detector device or as an occupancy detector network, wherein the occupancy detector network is configured as a mesh network or a star network, wherein the mesh network and the star network are comprised by network and protocol structure of at least one of Bluetooth, ZigBee, ZWave, Wi-Fi, Wirepas, Thread, 6LoWPAN, and any other wireless networks and protocols that allow wireless mesh network structure and/or wireless star network structure; and
  wherein the single detector device or the occupancy detector network configured to communicate (transmit and/or receive) wirelessly via the at least one radio, the status of the platform or the plurality of statuses of the platform to at least one mobile device and/or a central device, wherein the central device allows full access for control and monitoring of the single detector device or the occupancy detector network for an administrating staff of the venue.

11. The venue service optimization system of claim 10, wherein the occupancy detection device further configured with at least one display, wherein the status of the platform or the plurality of statuses of the platform is indicated on the at least one display, wherein the status of the platform or the plurality of statuses of the platform includes at least one message, wherein the at least one user input is used to detect the status of the platform or the plurality of statuses of the platform.

12. The venue service optimization system of claim 10, wherein the occupancy detection device further configured to detect the status of the platform or the plurality of statuses of the platform via a wireless input method of the wireless communication via Bluetooth and/or the wireless communication via near field communication (NFC), wherein the occupancy detection device is in communication with the at least one mobile device and/or at least one near field communication (NFC) key via the wireless input method, wherein the status of the platform or the plurality of statuses of the platform includes at least one message.

13. The venue service optimization system of claim 10, wherein the occupancy detection device further configured to change the status of the platform or the plurality of statuses of the platform after a certain amount of time the platform is occupied and/or the platform is unoccupied, wherein the certain amount of time is configurable to be fixed or adjustable.

14. The venue service optimization system of claim 10, wherein the occupancy detector network or the single detector device communicates to at least one of the central device and the at least one mobile device through a cloud computer and/or a cellular network the status of the platform or the plurality of statuses of the platform, wherein the occupancy detector network or the single detector device is connected to at least one of a gateway, a router, a plurality of gateways and a plurality of routers to form a local network that communicates to the cloud computer and/or the cellular network, wherein the cloud computer and/or the cellular network communicates to the at least one mobile device, wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure.

15. The venue service optimization system of claim 10, wherein the occupancy detector network or the single detector device communicates to at least one of the central device and the at least one mobile device through a local network the status of the platform or the plurality of statuses of the platform, wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure.

16. The venue service optimization system of claim 10, wherein the occupancy detector network or the single detector device communicates to the at least one mobile device through the central device the status of the platform or the plurality of statuses of the platform, wherein the occupancy detector network or the single detector device and the central device are connected to a local network, wherein the local network is wired and/or wireless means of communication by use of at least one of Ethernet, Intranet, Wi-Fi, Bluetooth, ZigBee, ZWave, Wirepas, Thread, 6LoWPAN, and any other wired and/or wireless network and protocol structure that allows mesh network structure, star network structure and bus network structure, wherein the occupancy detector network or the single detector device communicates to the central device through the local network, wherein the central device communicates to a cloud computer and/or the cellular network, wherein the cloud computer and/or the cellular network communicates to the at least one mobile device.

17. The venue service optimization system of claim 10, wherein the at least one mobile device comprises one or more of at least one user mobile device, at least one checked-in mobile device and at least one staff mobile device, wherein the at least one user mobile device is used by possible guests of the venue who monitor the status of the platform or the plurality of statuses of the platform and not checked in to the platform, wherein the at least one user mobile device becomes the at least one checked-in mobile device when the at least one user mobile device checks in to the platform using the wireless communication via Bluetooth or the wireless communication via near field communication (NFC), wherein the at least one staff mobile device is used by the administrating staff of the venue, wherein the status of the platform or the plurality of statuses of the platform includes at least one message, wherein the at least one staff mobile device and/or the central device communicates (transmit and/or receive) the at least one message to the at least one checked-in mobile device.

* * * * *